United States Patent [19]

Robson et al.

[11] Patent Number: 4,610,094

[45] Date of Patent: Sep. 9, 1986

[54] LEVEL

[76] Inventors: George Robson, 829 Seventh St., Hermosa Beach, Calif. 90254; Paul Anderson, 23701 Surf Cove, Laguna Niguel, Calif. 92677

[21] Appl. No.: 777,658

[22] Filed: Sep. 19, 1985

[51] Int. Cl.[4] .............................................. G01C 9/32
[52] U.S. Cl. ........................................ 33/367; 33/348
[58] Field of Search ................ 33/367, 377, 379, 348, 33/348.2; 250/577; 73/293

[56] References Cited

U.S. PATENT DOCUMENTS

| 2,075,502 | 3/1937 | Carlson | 33/377 |
| 2,221,152 | 11/1940 | Rylsky | 33/348 |
| 2,541,215 | 2/1951 | Davis | 33/377 |
| 2,584,917 | 2/1952 | Powell | 33/377 |
| 3,673,697 | 7/1972 | Wasson | 33/348 |
| 4,164,077 | 8/1979 | Thomas | 33/348 |

Primary Examiner—Charles Frankfort
Assistant Examiner—Patrick R. Scanlon
Attorney, Agent, or Firm—Lawrence I. Field

[57] ABSTRACT

A level constructed of clear acrylic plastic including a piece of colored acrylic plastic which serves as a light collector and a continuous passageway in the clear acrylic which reflects the light collected by the piece of colored plastic. By partially filling the passageway with liquid, a line of reflected light appears on the wall of the passageway above the interface between the liquid surface in the passageway and the unfilled portion of the passageway, whereby the level is easier to read than ordinary bubble type levels.

2 Claims, 5 Drawing Figures

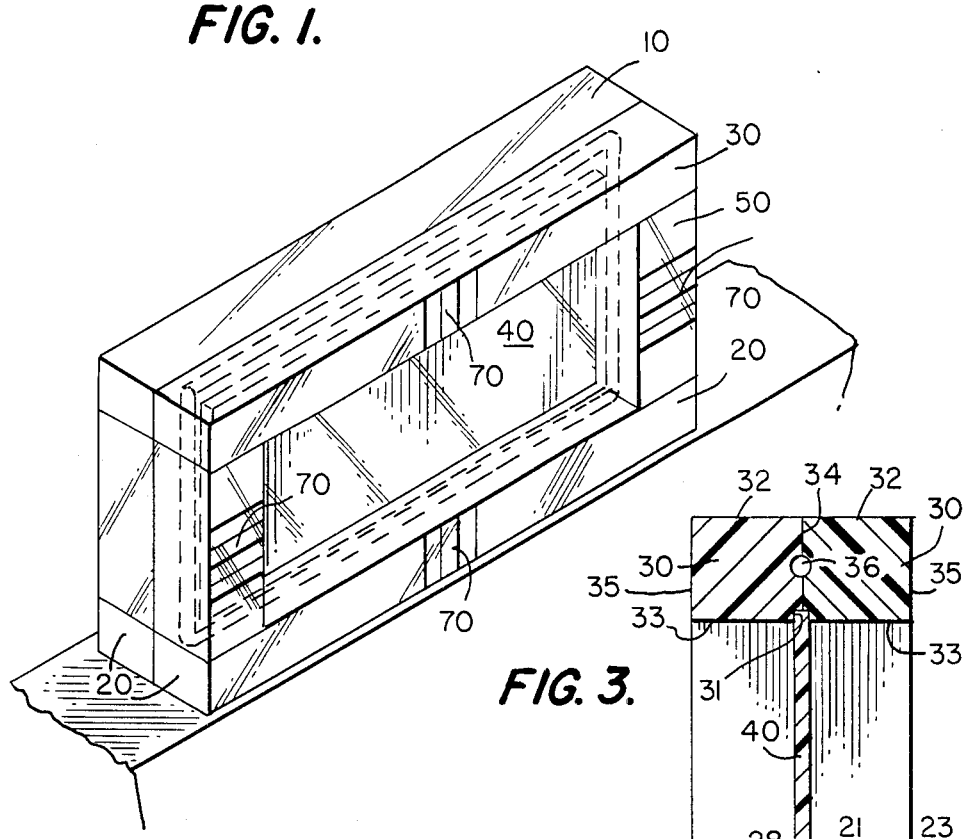
FIG. 1.
FIG. 3.
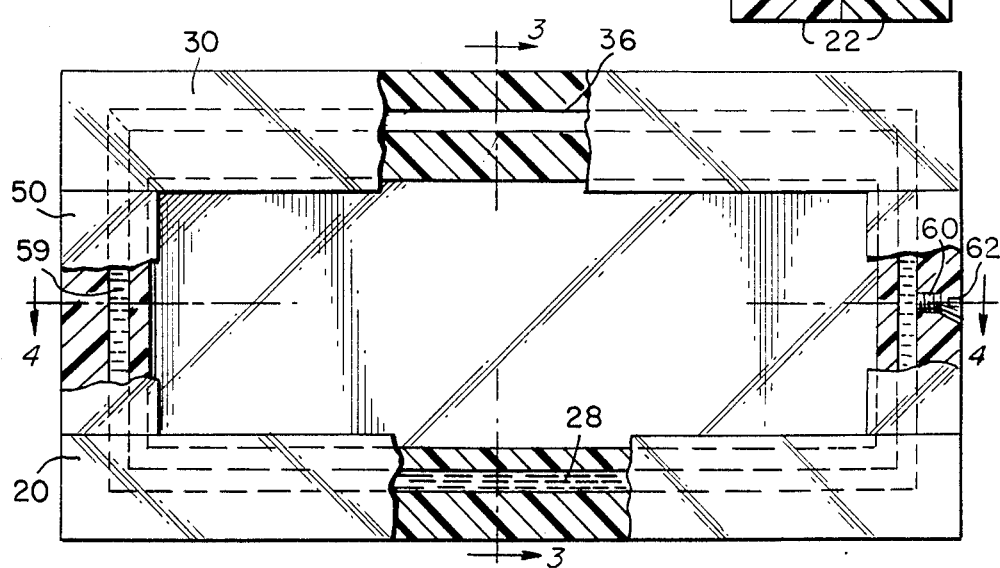
FIG. 2.

LEVEL

This invention is a level which is easier to use than conventional levels and which has an aesthetically pleasing appearance. More particularly, the present invention relates to a level which utilizes the light pipe characteristics of polymethylmethacrylate or similar acrylic plastics which enhances its readability.

The principal object of the invention is to provide a level made of transparent acrylic polymer and which contains a tubular cavity in which a liquid is disposed, a colored line appearing where there is no liquid in the cavity and no such line appearing where liquid is present.

This and other objects of the invention will become apparent or will be pointed out in the description of a preferred embodiment of the invention which follows in which:

FIG. 1 is a perspective view of the device of this invention;

FIG. 2 is a side elevation;

Figure 4:
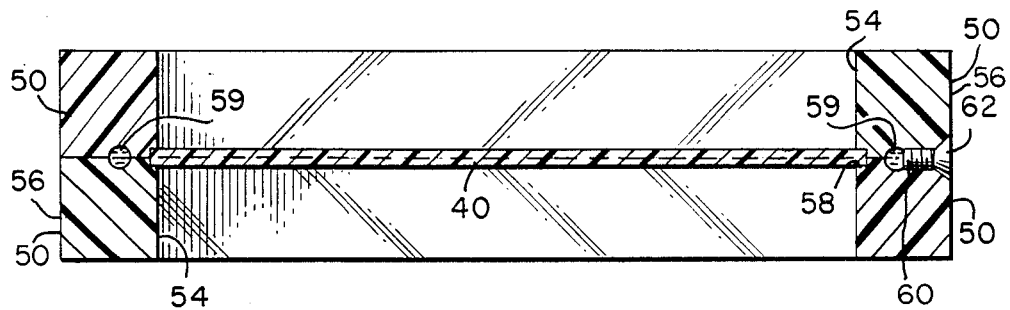
Figure 5:
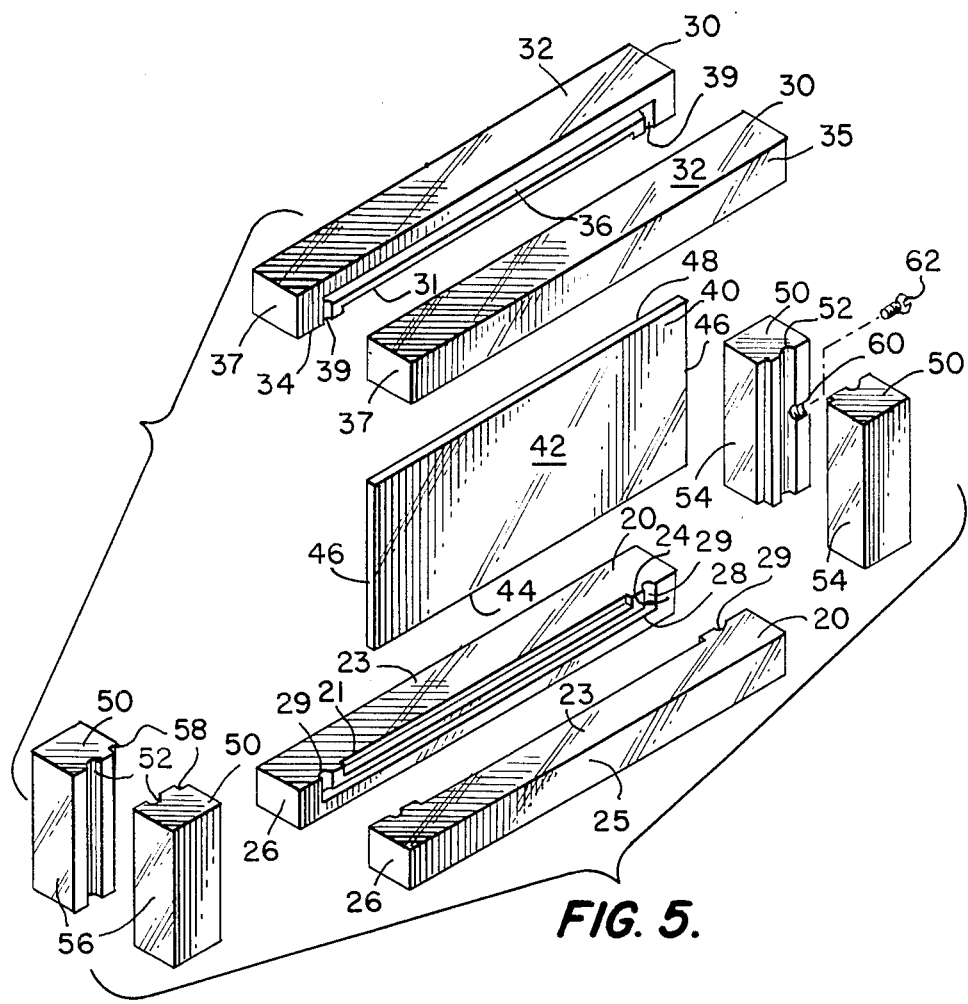

FIGS. 3 and 4 are views partly in section taken on planes 3—3 and 4—4 of FIGS. 2; and FIG. 5 is an exploded view of the device of this invention showing the several elements from which it may be assembled.

As may best be seen from FIG. 5, a preferred embodiment of the level 10 includes a pair of base blocks 20 which are composed of a clear acrylic plastic such as Lucite ™, a methylmethacrylate polymer sold by duPont. Each base block has a lower surface 22, an upper surface 23, an inner face 24 and an outer face 25. Each of these surfaces is a flat polished surface. Each block has a pair of end surfaces 26 which are also flat and polished. In the inner face 24 of each of base blocks 20 there is milled a semi-circular groove 28 which extends parallel to the lower surface 22 and parallel to the upper surface 23 of each base block 20. At the ends of each groove 28, there is an upwardly extending continuation 29 which terminates in the top surface 23 of its block 20.

A pair of cover blocks 30 having the same general dimensions as base blocks 20, each have a flat polished upper surface 32 and confronting polished side surfaces 34 in which a semi-circular groove 36 is milled, similar to groove 28 except that each end of groove 36 terminates in a downwardly oriented extension 39 extending to the bottom face 33 of each block. The top 32, bottom 33, sides 34 and 35 and end surfaces 37 of blocks 30 are flat and are highly polished in the same manner as the surfaces of blocks 20.

Each base block 20 may be provided with a recess 21 adapted to receive edge 44 of a slab 40 of clear colored plastic which is preferably an acrylic polymer containing a small concentration of a fluorescent dye which is dissolved in or is dispersed in the polymer while it is a liquid and before it solidifies into slab 40. The preferred coloring agent is a commercially available material sold as DAYGLO PIGMENT. A similar groove 31 is provided in cover blocks 30 to receive the opposite edge 48 of slab 40 and grooves 58 are milled on end pieces 50 to receive edges 46 of slab 40.

In addition to cover blocks 30 and base blocks 20 there are a pair of end pieces 50 of clear acrylic polymer at each end of the level. End pieces bridge the space between base blocks 20 and cover blocks 30. Each of end pieces 50 is provided with a semi-circular groove 52 extending the length of one face of the piece, approximately midway between an inner face 54 and an outer face 56. When two end pieces are brought together grooves 52 form a single passageway 59 for liquid and connect the passageways formed by grooves 28 and 29 in the base blocks and by grooves 36 and 39 in the top blocks to each other. All of the surfaces of end pieces 50 are flat and are polished in the same manner as the surfaces on blocks 20.

The level may be assembled from the slab 40 and the eight pieces of clear plastic, namely two base blocks 20, two cover blocks 30 and four end pieces 50 respectively, e.g., by means of a clear colorless adhesive. A first pair of blocks, e.g., 20 and 20 are brought face to face on either side of pigmented slab 40 and they are cemented together with a clear adhesive and then to the pairs of end blocks 50 and then to the cover blocks 30.

A fill opening 60 may be drilled into one pair of end blocks 50 after they have been assembled. Opening 60 may be later closed by means of a screw 62.

When the completed block is stood on its end with the fill opening 60 at the top a transparent liquid, e.g., water or a colored liquid is poured into the fill hole to fill about half the tubular passageway formed by grooves (28, 29, 52, 36 and 39) and then a screw 62 or other closure is applied to close filling opening 60.

The level need not be rectangular and could be oval or circular.

In service, the level is used like other known devices. Base block 20 is placed on a surface to see if it is level. The above-mentioned light pipe characteristics of polymethylemethacrylate or similar acrylic plastics enable the slab of colored plastic 40 to be a light collector. Due to this "light pipe" characteristic, light entering polished faces 42 is reflected and exits through roughened edges 44, 46, 48. Therefore, the slab 40 provides a path of light from its surface through the clear acrylic blocks to the groove. The groove reflects the light which appears as a line along the groove the same color as the colored plastic slab. When a liquid is introduced into the groove, this reflection does not take place. Therefore, when being used, this level is easier to use than conventional levels because the surface of the liquid terminates the light.

In order to obtain the "light pipe" properties of the acrylic it is essential that all surfaces through which light enters the level should be polished and surfaces through which light exits should be roughened. Therefore, the slab 40 of clear colored plastic is polished on its broad faces 42 and is roughened by a buffer on its narrow faces 44, 46, 48.

Instead of assembling from the separate blocks as shown, the end pieces 50 could be extruded as a single piece 50' with a central passage 52, a groove 58 adjacent face 54 and a filling opening 60 could then be drilled. Other similar changes may be made without departing from the spirit of the invention.

Marks 70 or grooves may be provided in the surface of the plastic so that the orientation of the level (level or not level) may be readily ascertained.

Having now described the invention, it is not intended that it be limited except as may be required by the appended claims.

We claim:

1. A level comprising:
    a clear acrylic plastic body provided with a passageway having walls and adapted to be partially filled with a liquid;

a piece of colored acrylic plastic supported in said clear plastic body and having at least one polished portion which collects light and roughened edge portions which emit light collected by the polished portion, the light so collected being reflected by the walls of an unfilled portion of the passageway and being visible as a line on the walls of said passageway above a surface of said liquid when said level is supported on a surface.

2. A level comprising in combination:

a pair of clear acrylic base members having polished top, bottom and side surfaces, secured to each other along one surface;

two pairs of clear acrylic end members having polished top, bottom and side surfaces;

a pair of clear acrylic top members having polished top, bottom and side surfaces;

and a slab of colored acrylic plastic, having at least one polished portion which collects light and roughened edge portions which emit light collected by the polished portion, said clear members being joined to one another to form a frame around a perimeter defined by said roughened edge portions of said slab of colored plastic, there being a passageway in said clear members disposed adjacent to but spaced from the perimeter of said slab; and a liquid filling at least a portion of said passageway whereby light collected by said slab is reflected by unfilled portions of said passageway and is visible as a line on the unfilled portions of said passageway above a surface of said liquid when said level is supported on a surface.

* * * * *